Patented Sept. 20, 1949

2,482,289

UNITED STATES PATENT OFFICE 2,482,289

REACTIVATING A COPPER CATALYST BY TREATING WITH SODIUM CHLORIDE SOLUTION

Wesley William Riches, Newport, Del., assignor to E. I. du Pont de Nemours & Company, Wilmington, Del., a corporation of Delaware No Drawing. Application January 29, 1947, Serial No. 725,154

6 Claims. (Cl. 252—412)

This invention relates to the production of titanium tetrachloride, and more particularly to the reactivation of copper metal employed in the purification of that compound.

Titanium tetrachloride is commonly prepared by the action of chlorine on titanium-bearing ores, such as ilmenite and rutile. During the chlorination other volatile chlorides, particularly those of silicon, iron, and vanadium, are also formed, and must be removed from the titanium tetrachloride before it can be usefully employed commercially. Partial purification and separation of compounds, such as ferric chloride and silicon tetrachloride, which have boiling points appreciably removed from that of titanium tetrachloride, may be accomplished by fractional distillation, but more complex methods are required for the separation of the vanadium chlorides. In the copending application of Holger H. Schaumann, Serial No. 661,914, filed April 12, 1946, pure, water-white titanium tetrachloride, substantially free from vanadium and other impurities, is obtained by distilling an impure form of such product over metallic copper (in the form of discrete particles, such as scrap, heavy copper turnings, borings, copper Raschig rings, etc.) as a contact mass. Periodically such mass must be reactivated by treatment with a non-oxidizing solution of an inorganic or organic acid, preferably dilute hydrochloric acid.

Acid treatment to reactivate the copper contact mass in the above purification operation, though highly useful and efficient, is relatively expensive and hence economically unattractive for use from a commercial standpoint. For example, even though a non-oxidizing acid is employed in the treatment, appreciable quantities of copper metal are removed during such treatment which obviously shortens the life of the copper contact mass. Additionally, the limited solubility of CuCl renders the process somewhat time-consuming and considerable quantities of acid are required to be used. Furthermore, the recovery of the valuable constituents from the solutions used in the leach is relatively expensive, due to the fact that relatively large amounts of acid must be neutralized.

It is the object of this invention to overcome these and other disadvantages which have characterized prior methods for reactivating copper contact masses employed in titanium tetrachloride purifications, and to provide novel methods for attaining such objects. Further objects include: effecting such reactivation while minimizing loss of copper from the metallic mass; removing metal chloride impurities from the surfaces of the copper contact mass, and attaining maximum reactivation of the metal for further use; and providing a novel method for effecting in particular substantially complete removal of vanadium and copper chlorides from the surfaces of the contact mass, with accompanying advantageous recovery of useful forms of both copper and vanadium as valuable by-products. Other objects and advantages of the invention will be apparent from the following description thereof:

These and other objects are attained in this invention which comprises reactivating a copper contact mass employed in titanium tetrachloride purification by treatment with a solution of sodium chloride.

In a more specific and preferred embodiment, the invention comprises reactivating a copper contact mass in the form of discrete pieces and containing a coating of copper and vanadium chlorides as impurities, by subjecting said mass to the action of a saturated solution of sodium chloride.

In practically applying the invention, in accordance with one preferred adaptation wherein titanium tetrachloride is distilled in a conventional type distillation column packed with a contact mass, such as copper Raschig rings, over and through which the vaporized $TiCl_4$ is passed, said column is drained as dry as possible at the end of the distillation period and when contamination of said mass is observed by reason of the existence of a black coating of copper and vanadium chlorides thereover. Trapped liquids are removed by blowing out the column with an inert gas and until said column is substantially free from volatile chlorides. This pre-cleaning procedure is preferable, though not essential to the practice of the invention, since it results in a more economical process and loss is thereby averted of considerable quantities of titanium tetrachloride, as well as contamination prevented of the vanadium and copper chlorides to be recovered. A sodium chloride solution, preferably saturated, is then circulated through the distillation column and until the copper rings have lost their black coating and appear bright and metallic. If desired, separate, repeated washing with fresh solutions of the chloride may be resorted to, or a wash solution may be recirculated through the column. Preferably, use is avoided of an air lift or air agitation in the treating and cleaning operation, since the presence of appreciable amounts of oxygen induces oxidation of the cuprous chloride to the cupric state and subsequent attack upon the fresh copper metal. After the treatment, the salt solution is drained from the column and the latter may then be dried, after which it is ready for reuse in the purification operation. As a result of such treatment, the copper is equally as effective in purifying the titanium tetrachloride as it was originally, and can be used for another prolonged period before further activation treatment will be again required.

Alternatively, the vanadium chlorides present, being quite soluble in water, can, if desired, be removed first by resorting to a water wash, following which the copper chlorides can be removed from the rings by means of the sodium chloride treatment herein contemplated. This modification of my invention will require a longer period, however, and hence is not preferred, being less economical than the single-step operation wherein all of the chlorides are removed together in the sodium chloride treatment.

The solution recovered from the washing or leaching operation will contain substantial amounts of vanadium chlorides and a complex of copper and sodium chlorides, together with small amounts of chlorides of titanium and iron. These can be easily separated and recovered by conventionally-known methods.

The examples below, in which the parts used are by weight, are given as illustrations of methods of carrying out this invention, and are not to be construed as limitations thereof:

Example 1

A conventional glass distillation column was packed with 665 parts of ¼" copper Raschig rings. 20,611 parts of titanium tetrachloride, previously distilled to remove most of the lower-boiling compounds and iron chloride, and containing 1270 parts of vanadium per million, were vaporized and fed through this packed column. A pure, water-white distillate product was obtained until near the end of the operation, when the rings became coated and the distillate produced became yellow in color. At this point, the column was drained, and dry nitrogen was blown through it for half an hour to remove the remaining titanium tetrachloride from the column packing. 300 parts of a saturated sodium chloride solution were then circulated through the column for an hour, by means of a nitrogen lift. This procedure was repeated twice, using fresh sodium chloride solutions in each instance. The column was then rinsed with 650 parts of water, dried, and $TiCl_4$ distillation resumed, to obtain again a pure, water-white titanium tetrachloride distillate.

The copper rings weighed 609 parts after this treatment, losing 56 parts, or 8.4% of their original weight, during the distillation and treatment. By analysis, the first leach solution contained 36.7 parts of copper; the second 15.8 parts; the third, 3.4 parts, and the wash water, 0.7 part. This totalled 56.6 parts of copper recovered, which was slightly more than the loss in weight of the copper packing.

Example II

A distillation apparatus similar to that used in Example I was packed with 608 parts of ¼" copper Raschig rings. 22,500 parts of pre-distilled titanium tetrachloride, containing 912 parts per million of vanadium, were distilled through the column. A water-white distillate, containing approximately 1 part of vanadium per million, was obtained until 21,000 parts of titanium chloride had been distilled, when the vanadium content of the distillate began to increase gradually. The last 400 parts distilled contained 67 parts per million of vanadium.

The column was drained, and dried with a stream of nitrogen for half an hour to remove the titanium chloride clinging to the rings. 2,200 parts of a saturated sodium chloride solution were thereupon recirculated through the column for a period of three hours, after which the column was drained and dried by passing warm air through it, and distillation therein of titanium tetrachloride was resumed. A water-white distillate containing less than 1 part per million of vanadium was again recovered.

The sodium chloride solution used for cleaning the column was found to contain 68 parts of copper and 20 parts of vanadium.

While described above as applied to certain preferred embodiments, the invention is not limited thereto, since it may be varied therefrom without departing from its underlying principles and scope. The choice of an exact process will depend on the demands of a particular application. Thus, while impurity removal from the copper can be effected by simply soaking the contact mass in a sodium chloride solution, such removal is advantageously accelerated if the treating solution is agitated. Thus, a non-oxidizing gas, such as notrogen, hydrogen, or other gas inert toward the copper and treating solution can be bubbled through the solution during its contact with the copper and will be found to improve the rate of cleaning considerably. As already noted, oxidizing gas use should be avoided, since it promotes attack of the copper metal itself. In lieu of immersion of the contact mass in the solution, the latter may, if desired, be sprayed over such mass, either continuously or intermittently during the cleaning operation. More or less continuous circulation of the cleaning solution through the vessel and over the contact mass is the most effective method, and hence this method of cleaning is preferred. In some instances, the contact mass may be removed from the apparatus and treated in accordance with the invention in a separate vessel. In such event, tumbling barrels, scrubbing mechanisms, and similar devices can be restorted to in order to facilitate the desired cleaning operation.

Although, as stated in the above example, I prefer to remove as much as possible of the titanium tetrachloride adhering to the copper contact mass before introducing the cleaning solution, this is simply an economic measure, to conserve the titanium tetrachloride. Any of this material remaining on the copper will be removed in the wash solution, and hence can subsequently be separated and recovered from the vanadium and copper, if desired.

Again, while the use of a saturated or relatively concentrated salt solution is preferred, because its use affords the most rapid cleaning of the copper contact mass, less concentrated solutions of sodium chloride can be used and to as low as 200 g. NaCl/l., bearing in mind that the solubility of copper chloride decreases particularly rapidly below concentrations of about 250 grams of sodium chloride per liter, and hence, some sacrifice in the efficiency of the washing operation may result.

After treatment of the contaminated copper contact mass, in accordance with my invention, it will become thoroughly cleaned, and will prove equally as effective during use in the subsequent purification of titanium tetrachloride, and will accomplish removal of vanadium compounds, with as much facility and completeness as a similar charge of new copper metal. The cleaning operation is simple and quick, requiring only the most inexpensive materials, and can be readily carried out without removing the copper contact mass from the distillation apparatus. The unused copper is not appreciably attacked by the cleaning solution, so that little or no copper loss is incurred over the amount of copper required to remove the vanadium compounds from the titanium tetrachloride. The residual copper and vanadium compounds from the treatment are in relatively concentrated form and in a salt solution from which they can be easily recovered without the necessity of resorting to neutralization of large quantities of cleaning acids with the reagents which precipitate the copper and vanadium compounds. The solutions remaining after copper and vanadium extraction will usually comprise fairly pure, concentrated brine, which can be used for subsequent cleaning operations, either as is, or with very little additional treatment.

The particular effectiveness of my treatment in reactivating a metallic copper contact mass appears to arise from the formation of a sodium chloride-cuprous chloride complex during the sodium chloride treatment which is soluble in water and is readily removed in the final rinsing operation. Cuprous chloride is only slightly soluble in water, its solubility at 25° C. being of the order of 15 grams per 1000 grams of water. At the same temperature, its solubility in a saturated sodium chloride solution is approximately 500 grams per 1000 grams of water, while only about 150 grams of cuprous chloride will dissolve in 1000 grams of a dilute (20%) hydrochloric acid solution.

I claim as my invention:

1. A method for reactivating a copper contact mass and removing metal chloride contaminants therefrom which comprises subjecting said mass to the action in the absence of appreciable amounts of oxygen of a solution of sodium chloride, at a concentration of at least 200 g./l. NaCl until said chloride contaminants are dissolved in said solution, and then drying the purified mass prior to reuse.

2. A method for reactivating a copper contact mass and removing metal chloride contaminants therefrom which comprises subjecting said mass to the action in the absence of appreciable amounts of oxygen of a saturated solution of sodium chloride, until said contaminants are dissolved in said solution, and then drying the purified mass prior to reuse.

3. A method for reactivating a vanadium chloride-contaminated copper contact mass utilized in titanium tetrachloride purification which comprises soaking said mass in the absence of appreciable amounts of oxygen in a concentrated sodium chloride solution to effect removal of the contaminant, and removing said solution from the treated mass by water rinsing and drying said mass prior to its reuse.

4. A method for reactivating a vanadium chloride-contaminated copper contact mass employed in a distillation column, which comprises passing a saturated sodium chloride solution through said column and over said mass for a sufficient period of time to effect the removal of contaminant present on said mass, and then water rinsing and drying the treated mass prior to reuse.

5. A method for removing contaminant metal chlorides from a copper contact mass employed in titanium chloride purification which comprises soaking and washing said mass in the absence of appreciable amounts of oxygen in a saturated sodium chloride solution until said metal compounds are dissolved in said solution, and then water rinsing and drying the treated mass prior to reuse.

6. A method for removing vanadium and copper chlorides from a copper contact mass in which said chlorides are present as contaminants which comprises washing said mass in the absence of appreciable amounts of oxygen with a circulated concentrated sodium chloride solution until substantially all of said copper and vanadium compounds are dissolved, separating the resulting solution from the said mass, and then water rinsing and drying the treated mass prior to reuse.

WESLEY WILLIAM RICHES.

REFERENCES CITED

The following references are of record in the file of this patent:

Mellor, "Treatise on Inorganic and Theoretical Chemistry," vol 3, page 162 (1923).